(12) United States Patent
Kang

(10) Patent No.: US 12,147,834 B2
(45) Date of Patent: Nov. 19, 2024

(54) SYSTEM AND METHOD OF EXECUTING TASK OF OPERATING SYSTEM FOR VEHICLE

(71) Applicant: Hyundai AutoEver Corp., Seoul (KR)

(72) Inventor: Jin Uk Kang, Hwaseong-si (KR)

(73) Assignee: Hyundai AutoEver Corp., Seoul (KR)

( * ) Notice: Subject to any disclaimer, the term of this patent is extended or adjusted under 35 U.S.C. 154(b) by 514 days.

(21) Appl. No.: 17/513,295

(22) Filed: Oct. 28, 2021

(65) Prior Publication Data

US 2022/0188153 A1    Jun. 16, 2022

(30) Foreign Application Priority Data

Dec. 16, 2020    (KR) .......................... 10-2020-0176522

(51) Int. Cl.
*G06F 9/48* (2006.01)
*G06F 9/50* (2006.01)
*G05D 1/00* (2024.01)

(52) U.S. Cl.
CPC .......... *G06F 9/4881* (2013.01); *G06F 9/5016* (2013.01); *G05D 1/0088* (2013.01)

(58) Field of Classification Search
CPC ...... G06F 9/4881; G06F 9/5016; G06F 9/542; G06F 9/4406; G06F 9/5038; G06F 9/52; G06F 2209/484; G06F 2209/5021; G05D 1/0088

See application file for complete search history.

(56) References Cited

U.S. PATENT DOCUMENTS

| | | | |
|---|---|---|---|
| 2006/0090160 A1* | 4/2006 | Forsythe ................ | G06Q 10/06 718/100 |
| 2011/0113431 A1* | 5/2011 | Shidai .................... | G06F 9/4887 718/103 |
| 2011/0205042 A1* | 8/2011 | Takemura ............. | B60W 30/08 340/435 |
| 2013/0147941 A1* | 6/2013 | Okada .................. | G02B 21/008 348/80 |
| 2019/0187998 A1* | 6/2019 | Akimoto ................... | G06F 1/26 |
| 2020/0264922 A1* | 8/2020 | Kamiya ................ | G06F 9/4881 |
| 2022/0237029 A1* | 7/2022 | Kwon ............... | H01M 10/4207 |
| 2023/0214778 A1* | 7/2023 | McMahon ............ | H04L 9/3268 |

FOREIGN PATENT DOCUMENTS

| | | |
|---|---|---|
| JP | H07-82363 B2 | 9/1995 |
| JP | 2001-100807 A | 4/2001 |
| JP | 2019-125916 A | 7/2019 |
| KR | 10-0988395 B1 | 10/2010 |
| KR | 10-1353065 B1 | 1/2014 |

* cited by examiner

*Primary Examiner* — Sisley N Kim
(74) *Attorney, Agent, or Firm* — Bridgeway IP Law Group, PLLC; Jihun Kim

(57) ABSTRACT

Proposed is a system for executing a task of an operating system for a vehicle, the system including: a task information extracting unit which, when an event signal is received from an application, extracts task information related to the event signal from a pre-prepared event chain table; an execution cycle setting unit which sets a task execution cycle by using the extracted task information; a task executing unit which executes any one task among a plurality of tasks according to the task execution cycle; and a waiting time providing unit which provides a task waiting time to the task executing unit so as to wait for execution of a next task when the execution of the one task is completed.

8 Claims, 3 Drawing Sheets

SYSTEM AND METHOD OF EXECUTING TASK OF OPERATING SYSTEM FOR VEHICLE

CROSS-REFERENCE TO RELATED APPLICATIONS

This application claims priority to and the benefit of Korean Patent Application No. 10-2020-0176522 filed in the Korean Intellectual Property Office on Dec. 16, 2020, the entire contents of which are incorporated herein by reference.

TECHNICAL FIELD

The present invention relates to a system and a method of executing a task of an operating system for a vehicle, for example, to a system and a method of executing a task of an adaptive AUTOSAR operating system.

BACKGROUND ART

Recently, as a new trend of electric vehicles and autonomous driving is formed in the automobile industry, Information Technology (IT) convergence technologies that can be used in vehicle fields such as Advanced Driver Assistance System (ADAS) and Vehicle-to-X (V2X) are actively created and developed.

Particularly, the cases of applying the Linux operating system to a vehicle controller are increasing, because applications, such as infotainment and V2X, using various drivers of the Linux operating system can be easily implemented.

The Linux operating system can supplement the limitations of the Classis AUTOSAR operating system, but has a limitation in that it is impossible to support a separate diagnosis function or a vehicle network, such as CAN communication.

The Adaptive AUTOSAR operating system has emerged as a result of the supplement of the disadvantages and technological advancement.

The Adaptive AUTOSAR operating system supports high-performance hardware, various audio drivers, various video drivers, and external interfaces required for applying future advanced functions to automobiles, and technological advancements are made to satisfy vehicle communication networks and security.

The Adaptive AUTOSAR operating system basically guarantees periodicity and deterministic execution of task scheduling operations in the unit of a process. The Adaptive AUTOSAR operating system is not concerned with task scheduling for an individual thread within a process.

When an application for a vehicle implemented with the plurality of threads is separated in the unit of an individual process, in the operating system, system resources need to be newly set for each process and structural changes of the existing designed application for vehicle are inevitable, so that the functional operation cannot be guaranteed.

In the meantime, the application for a vehicle based on high-performance hardware is formed of a plurality of threads within a single process. In the application for a vehicle, synchronization between internal threads is very important, and synchronization means the order of operations of the threads.

The application for a vehicle is operated in the form of an independent thread. The thread operates periodically, and if the periodicity of the thread is disturbed, an erroneous operation may occur in the unique algorithm desired to be implemented in the application.

Requirements for diagnosis and security functions commonly used in the application for vehicle needs to be satisfied.

Accordingly, in order to meet the requirements of the application for a vehicle, a method of task synchronization in the Adaptive AUTOSA operating system is required.

SUMMARY OF THE INVENTION

The present invention has been made in an effort to provide a system and a method of executing a task in an operating system of a vehicle in which synchronization between tasks is implemented by independently executing a task according to a task execution cycle, rather than performing synchronization through a correlation between the plurality of tasks.

An exemplary embodiment of the present invention provides a system for executing a task of an operating system for a vehicle, the system including: a task information extracting unit which, when an event signal is received from an application, extracts task information related to the event signal from a pre-prepared event chain table; an execution cycle setting unit which sets a task execution cycle by using the extracted task information; a task executing unit which executes any one task among a plurality of tasks according to the task execution cycle; and a waiting time providing unit which provides a task waiting time to the task executing unit so as to wait for execution of a next task when the execution of the one task is completed.

The task information may include a task list, a task cycle, a task priority, and a task execution order.

The system may further include: a memory allocating unit which allocates the extracted task information to a memory region; and a core setting unit which sets a predetermined core to execute the task.

The event signal may be a periodical signal.

The task executing unit may execute the plurality of tasks included in the task list in order based on the task priority and the task execution order.

The task executing unit may wait for the execution of a next task according to the task waiting time when the execution of the one task included in the task list is completed.

The task executing unit may repeatedly execute the task of the task list as the event signal is periodically generated.

Another exemplary embodiment of the present invention provides a method of executing a task of an operating system for a vehicle, the method including: a task information extracting operation in which when an event signal is received from an application, a task information extracting unit extracts task information related to the event signal from a pre-prepared event chain table; a task execution cycle setting operation in which an execution cycle setting unit sets a task execution cycle by using the extracted task information; a task executing operation in which a task executing unit executes any one task among a plurality of tasks according to the task execution cycle; and a waiting operation in which when the execution of the one task is completed, the task executing unit waits as much as a pre-prepared task waiting time for the execution of a next task.

The method may further include: an event signal receiving operation in which the task information extracting unit receives an event signal from the application; and a memory allocating operation in which a memory allocating unit allocates the task information to a memory.

The method may further include: a signal determining operation in which the task executing unit determines whether a periodical generation of the event signal continues; and an execution terminating operation in which the task executing unit terminates the execution of the task when the periodical generation of the event signal is terminated.

The task executing operation may include executing a next task after waiting as much as the task waiting time when the periodical generation of the event signal continues.

The task information may include a task list, a task cycle, a task priority, and a task execution order.

The task executing operation may include executing the plurality of tasks included in the task list in order based on the task priority and the task execution order.

The task executing operation may include repeatedly executing the task of the task list as the event signal is periodically generated.

According to the system and the method of executing the task of the operating system for the vehicle according to the exemplary embodiments of the present invention, there is an effect in that synchronization between the tasks is implemented by independently executing the task according to a task performance cycle, not through the interrelationship between the plurality of tasks.

There is an effect in that synchronization between the tasks is implemented by preparing a waiting time between the plurality of task execution cycles.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
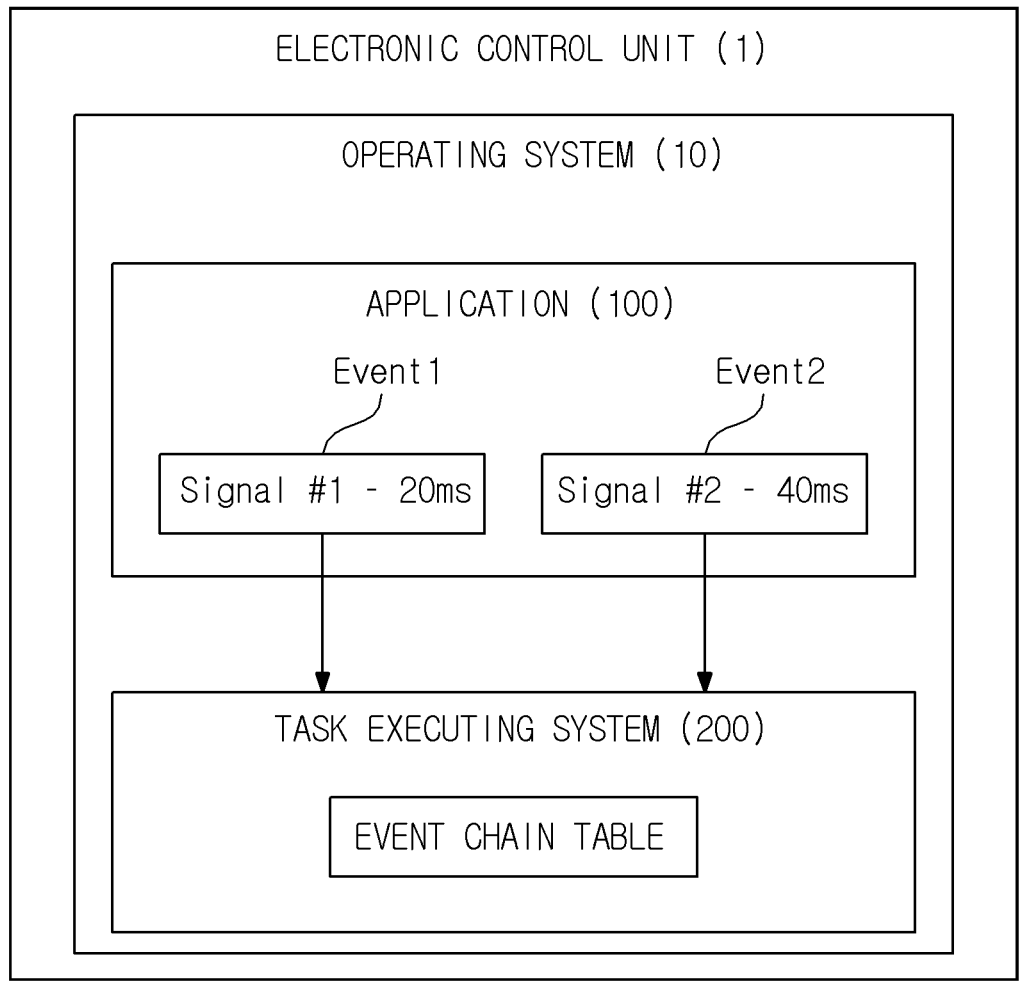
FIG. 1 is a schematic diagram illustrating a system for executing a task of an operating system for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, it should be noted that in giving reference numerals to elements of each drawing, like reference numerals refer to like elements even though like elements are shown in different drawings. It should be understood that although the exemplary embodiment of the present invention is described hereafter, the spirit of the present invention is not limited thereto and the present invention may be changed and modified in various ways by those skilled in the art.

FIG. 1 is a schematic diagram illustrating a system for executing a task of an operating system for a vehicle according to an exemplary embodiment of the present invention.

Referring to FIG. 1, an electronic control unit 1 may be configured to control various electronic control systems of a vehicle. An operating system 10 may be installed in the electronic control unit 1. The operating system 10 may be an Adaptive AUTOSAR operating system. The operating system 10 may support applications based on high-performance hardware, memory devices, audio/video drivers, external interfaces, and the like.

The application 100 may provide functions for diagnosis and security of a vehicle and the like. The application 100 may be periodically operated. When an operation cycle of the application 100 is disturbed, an erroneous operation may occur in an algorithm to be implemented in the application 100. In order to prevent the erroneous operation, the application 100 may be operated in the form of an independent thread. The application 100 may be formed of a plurality of threads. The plurality of threads may be operated in a serial order. Each of the plurality of threads may be periodically operated.

When the application 100 requests performance of functions of each of the plurality of threads, the application 100 may generate an event signal having periodicity. The event signal may include a first event signal Event1 and a second event signal Event2. The first event signal Event1 may have a cycle of 20 ms. The second event signal Event2 may have a cycle of 40 ms. The event signal may be generated according to the number of the plurality of threads.

A task execution system 200 may be a sort of software program. The task execution system 200 may receive the event signal for requesting the performance of the function of the thread from the application 100. The task execution system 200 may include an event chain table in which task information to perform the function of the thread of the application 100 is included. The event chain table may include a task list, a task cycle, a task priority, and a task execution order. The task execution system 200 may execute a task based on the event chain table.

A detailed configuration of the task execution system 200 will be described below with reference to FIG. 2.

Figure 2:
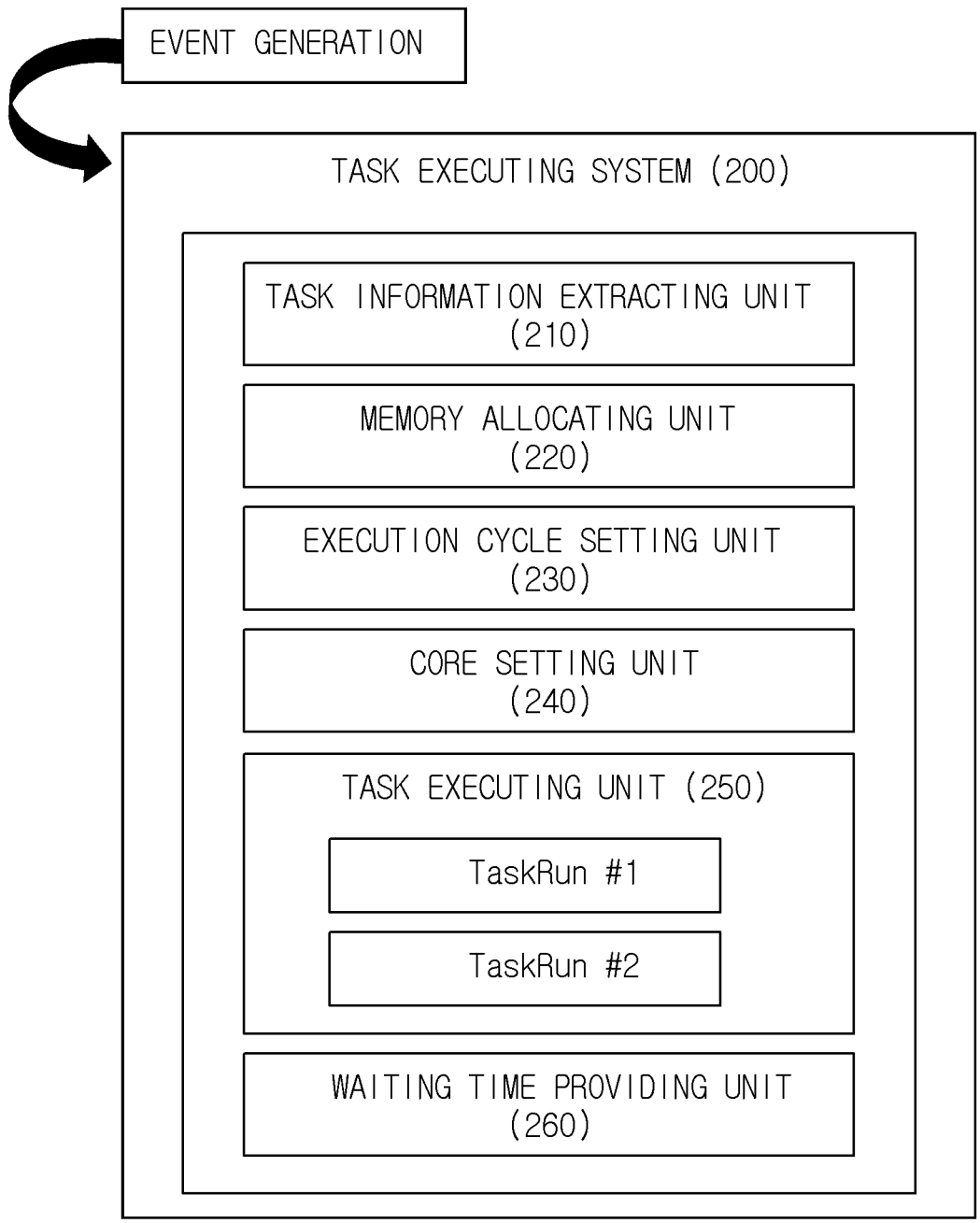
FIG. 2 is a configuration diagram illustrating the system for executing the task of the operating system for the vehicle according to the exemplary embodiment of the present invention.

FIG. 2 is a configuration diagram illustrating the system for executing the task of the operating system for the vehicle according to the exemplary embodiment of the present invention.

Referring to FIG. 2, the task executing system 200 may include a task information extracting unit 210, a memory allocating unit 220, an execution cycle setting unit 230, a core setting unit 240, a task executing unit 250, and a waiting time providing unit 260.

The task information extracting unit 210 may receive an event signal from the application 100. When the task information extracting unit 210 receives the event signal, the task information extracting unit 210 may extract task information from a previously prepared event chain table. In the exemplary embodiment, the task information extracting unit 210 may be a Python tool. The task information extracting unit 210 may generate a C source code by using the extracted task information.

The memory allocating unit 220 may allocate the task information extracted from the event chain table to a memory region.

The execution cycle setting unit 230 may set a task execution cycle by using the task information extracted from the event chain table.

The core setting unit 240 may set a predetermined core to execute the task among the plurality of cores of the electronic control unit 1. The core setting unit 240 may set a core in consideration of the amount of tasks.

The task executing unit 250 may execute any one task among the plurality of tasks according to the set task execution cycle. The task executing unit 250 may execute the plurality of tasks included in a task list based on a task priority and a task execution order in order. When the execution of any one task is completed, the task executing unit 250 may wait for a next task execution according to the task waiting time. The task executing unit 250 may repeatedly execute the plurality of tasks of the task list as the event signal is periodically generated.

The waiting time providing unit 260 may provide a task waiting time to the task executing unit 250. The task waiting time may be appropriately set according to the need of the user. Through this, without a constituent element for monitoring an absolute time of a separate hardware timer, the task executing unit 250 may execute a task according to the task cycle input to the event chain table after waiting as much as the task waiting time.

Hereinafter, an effect of the present invention compared to the related art will be described. In the exemplary embodiment, there is a case where when the plurality of tasks is performed, the plurality of tasks is allocated to the plurality of cores. In the related art, a task needs to be performed in a main core according to a routine of a scheduling table. In order for the task of the main core to be normally terminated and to be executed again, the communication protocol between the cores needs to be considered.

On the other hand, when the task executing unit 250 according to the present invention performs the task disposed in the core in run-time, the task executing unit 250 only waits as much as the task waiting time in order to perform the task again after terminating the performance of the task, without considering other cores. Accordingly, compared to the related art, there is an effect in that a small system load is generated.

Figure 3:
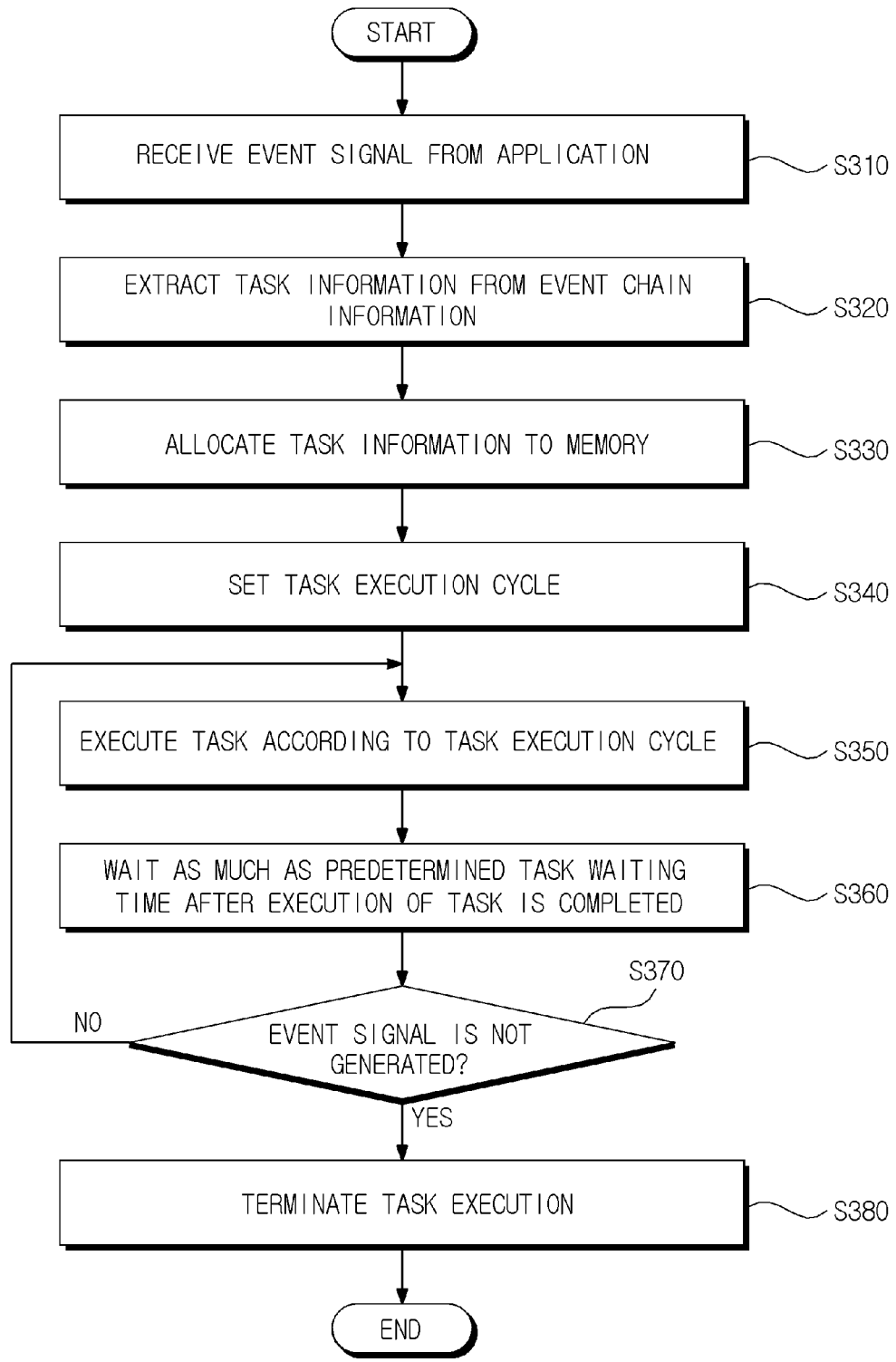
FIG. 3 is a flowchart illustrating a method system of executing a task of an operating system for a vehicle according to an exemplary embodiment of the present invention.

FIG. 3 is a flowchart illustrating a method of executing a task of an operating system for a vehicle according to an exemplary embodiment of the present invention.

Referring to FIGS. 2 and 3, a method of executing a task of an operating system for a vehicle may include an event signal receiving operation S310, a task information extracting operation S320, a memory allocating operation S330, a task execution cycle setting operation S340, a task executing operation S350, a waiting operation S360, a signal determining operation S370, and an execution termination operation S380.

In the event signal receiving operation S310, the task information extracting unit 210 may receive an event signal from an application.

In the task information extracting operation S320, the task information extracting unit 210 may extract task information related to the event signal received from a pre-prepared event chain table.

In the memory allocating operation S330, the memory allocating unit 220 may allocate the extracted task information to the memory. Then, the task information may be read from the memory to which the task information is allocated.

The task execution cycle setting operation S340, the execution cycle setting unit 230 may set a task execution cycle by using the task information. The execution cycle setting unit 230 may set a task execution cycle by considering a cycle of each task.

In the task executing operation S350, the task executing unit 250 may execute any one task among the plurality of tasks according to the task executing cycle.

In the waiting operation S360, the task executing unit 250 may wait as much as a task waiting time for the execution of a next task when any one task is completely executed.

In the signal determining operation S370, the task executing unit 250 may determine whether the periodical generation of the event signal continues. When the periodical generation of the event signal continues, the task executing unit 250 may perform a next task in the task executing operation S350.

In the execution termination operation S380, the task executing unit 250 may terminate the execution of the task when the periodical generation of the event signal is terminated.

Although the exemplary embodiment of the present invention has been described for illustrative purposes, those skilled in the art will appreciate that various modifications, additions and substitutions are possible, without departing from the essential characteristic of the invention. Therefore, the embodiments disclosed in the present invention and the accompanying drawings are not intended to limit the technical spirit of the present invention, but are intended to illustrate the scope of the technical idea of the present invention, and the scope of the present invention is not limited by the embodiment and the accompanying drawings.

The steps and/or operations according to the present invention may occur in different orders, or in parallel, or simultaneously in different exemplary embodiments for different epochs and the like as may be appreciated by those skilled in the art.

Depending on the exemplary embodiment, a part or the entirety of the steps and/or operations may be implemented or performed by using commands stored in one or more non-temporary computer-readable media, a program, an interactive data structure, and one or more processors driving a client and/or a server. One or more non-temporary computer-readable media are, for example, software, firmware, hardware, and/or any combination thereof. Further, the function of "module" discussed in the present specification may be implemented by software, firmware, hardware, and/or any combination thereof.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A system for executing a task of an operating system for a vehicle, the system comprising at least one processor configured to:
    extract task information related to an event signal from a pre-prepared event chain table when the event signal is received from an application;
    set a task execution cycle by using the task information extracted from the pre-prepared event chain table;
    determine whether a periodical generation of the event signal continues;
    when the periodical generation of the event signal continues, execute one task among a plurality of tasks according to the task execution cycle and wait as much as a task waiting time before executing a next task once an execution of the one task is completed; and
    when the periodical generation of the event signal is terminated, terminate the execution of the one task.

2. The system of claim 1, wherein the task information includes a task list, a task cycle, a task priority, and a task execution order.

3. The system of claim 1, wherein the at least one processor is further configured to:
    allocate the task information extracted from the pre-prepared event chain table to a memory region; and
    set a predetermined core to execute the one task.

4. The system of claim 2, wherein the at least one processor is configured to execute the plurality of tasks included in the task list in order based on the task priority and the task execution order.

5. A method of executing a task of an operating system for a vehicle, the method comprising:
    extracting task information related to an event signal from a pre-prepared event chain table when the event signal is received from an application;
    setting a task execution cycle by using the task information extracted from the pre-prepared event chain table;
    determining whether a periodical generation of the event signal continues;
    when the periodical generation of the event signal continues, executing one task among a plurality of tasks according to the task execution cycle and waiting as much as a pre-prepared task waiting time before executing a next task once the execution of the executing the one task is completed; and
    when the periodical generation of the event signal is terminated, terminating the executing the one task.

6. The method of claim 5, further comprising:
    receiving the event signal from the application; and
    allocating the task information to a memory.

7. The method of claim 5, wherein the task information includes a task list, a task cycle, a task priority, and a task execution order.

8. The method of claim 7, further comprising executing the plurality of tasks included in the task list in order based on the task priority and the task execution order.

* * * * *